F. L. VAN ALLEN.
APPARATUS FOR DESEEDING FLAX.
APPLICATION FILED MAY 19, 1919.

1,350,045.

Patented Aug. 17, 1920.
3 SHEETS—SHEET 1.

INVENTOR
FREDERIC L. VAN ALLEN

BY Fetherstonhaugh & Co.
ATTY'S

F. L. VAN ALLEN.
APPARATUS FOR DESEEDING FLAX.
APPLICATION FILED MAY 19, 1919.
1,350,045.
Patented Aug. 17, 1920.
3 SHEETS—SHEET 2.
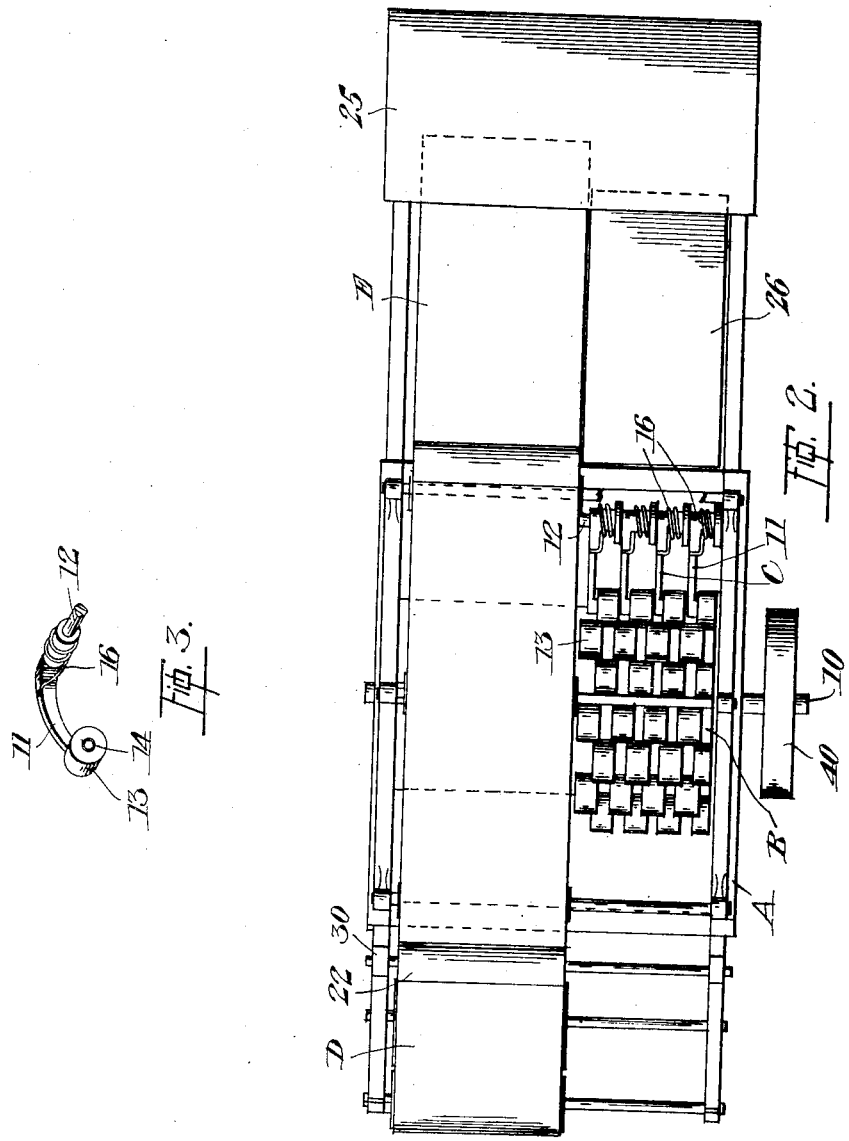
INVENTOR
FREDERIC. L. VanALLEN
BY Fetherstonhaugh & Co.
ATTY'S.

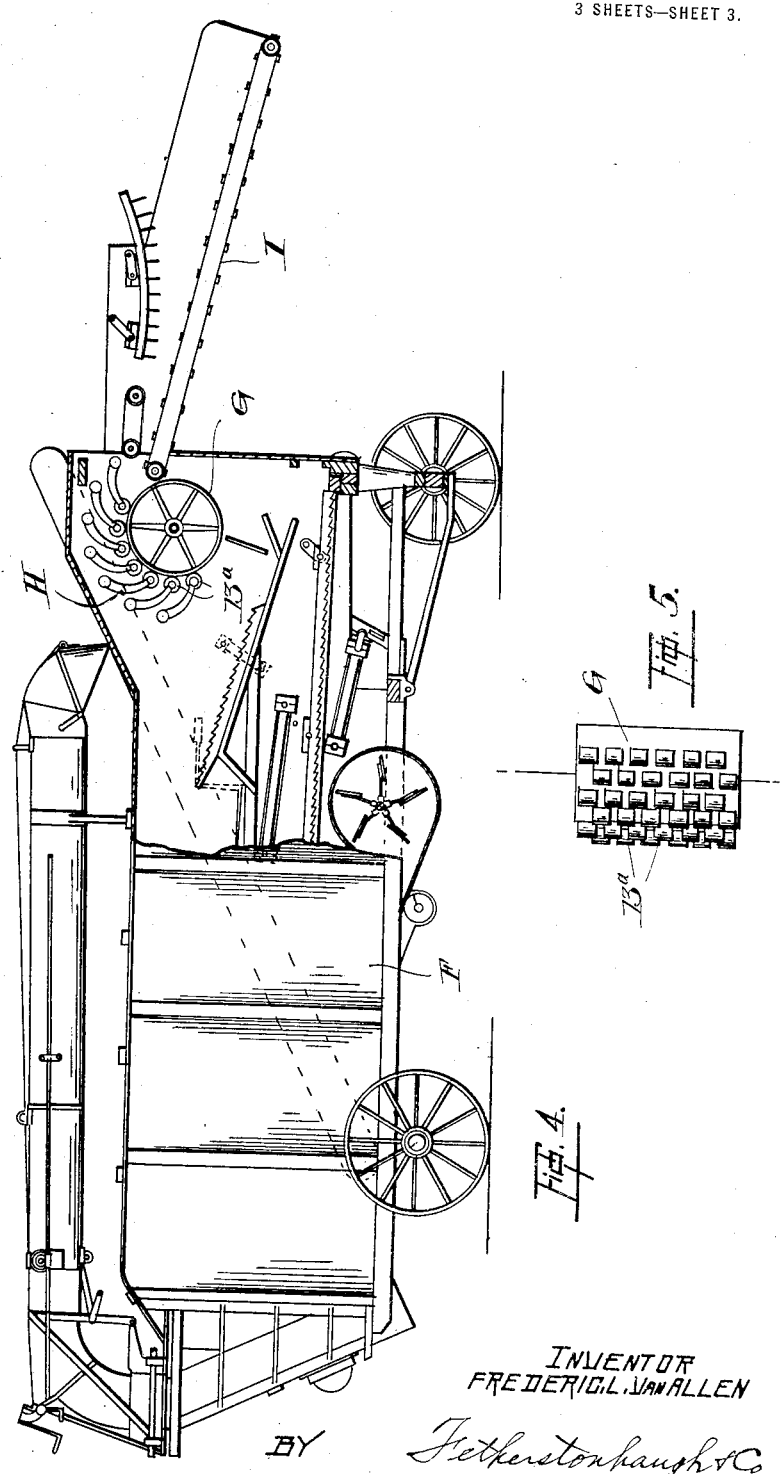

UNITED STATES PATENT OFFICE.

FREDERIC LANGTRY van ALLEN, OF REGINA, SASKATCHEWAN, CANADA.

APPARATUS FOR DESEEDING FLAX.

1,350,045.  Specification of Letters Patent.  Patented Aug. 17, 1920.

Application filed May 19, 1919. Serial No. 298,165.

*To all whom it may concern:*

Be it known that I, FREDERIC LANGTRY VAN ALLEN, a subject of the King of Great Britain, and resident of the city of Regina, in the Province of Saskatchewan, Dominion of Canada, have invented certain new and useful Improvements in Apparatus for Deseeding Flax, of which the following is a specification.

This invention relates to improvements in apparatus for deseeding flax.

The flax plant contains two useful commodities, linseed and textile fibers; its cultivation is specialized for one of these commodities to the detriment and sometimes to the complete destruction of the other.

Where specialization for linseed takes place large acreages of flax are cultivated. Harvesting the crop rapidly becomes a matter of vital importance. It is not bound into sheaves but raked or forked as hay, consequently the heads with the seed balls and the butts of the stalks are inextricably mixed and tangled together. The deseeding is accomplished by machines that are designed and constructed for threshing the standard cereals such as wheat or oats. This manner of threshing the flax, while rapid, results in breaking the flax stalk and consequently the fiber that it contains, into such short lengths as to render it unfit for commercial purposes.

When specialization for textile fiber takes place smaller acreages of flax are cultivated. The harvesting of this crop is accomplished by pulling the plant from the soil by the root and binding the stalks carefully into small sheaves. The deseeding process is a very slow one as the stalks containing the fiber have to be handled carefully and in such a manner that they shall remain unbroken and continue to lie in a position parallel to each other.

The object of my invention is to rapidly by mechanical means separate the seed from the flax plant without the stalk being injured and its further use for fiber production being impaired, and that irrespective of the object for which the plant has been specially cultivated, whether for linseed or textile fiber.

The invention consists essentially of the improved construction and arrangement of parts hereinafter described in detail in the accompanying specification and drawings.

In the drawings:

Fig. 2 is a plan view of the same.

Fig. 3 is a perspective view of one of the deseeding elements.

Fig. 4 is a sectional elevation showing an alternative form of the invention.

Fig. 5 is a plan view of the deseeding elements in the alternative form of the invention.

In the drawings like characters of reference indicate corresponding parts in all the figures.

Figure 1:
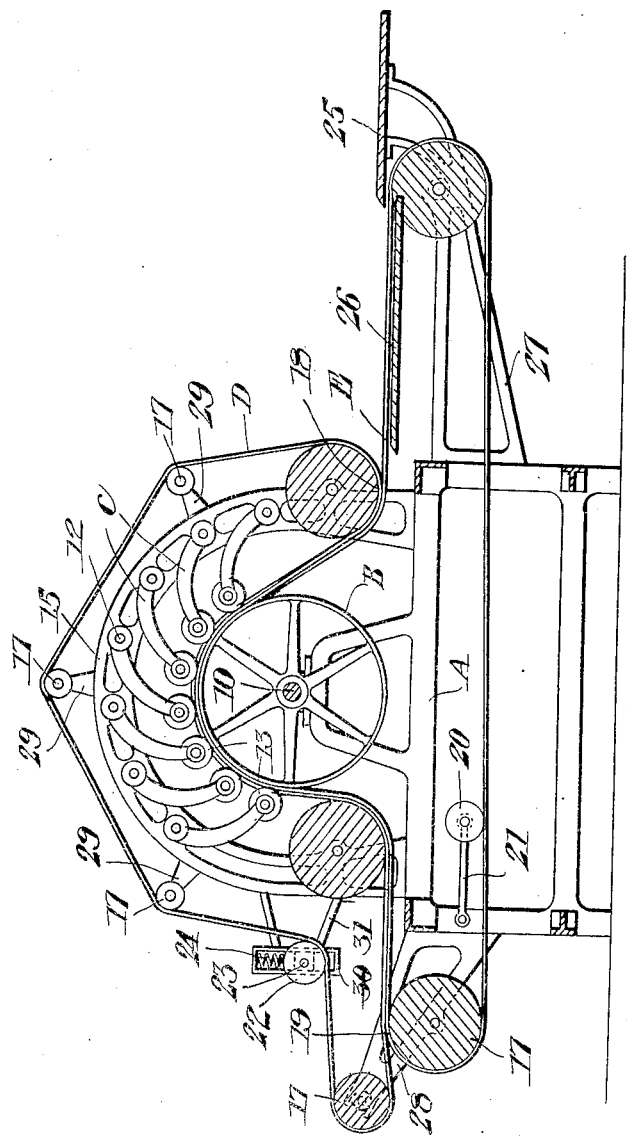
Figure 1 is a sectional elevation of an embodiment of the invention.

In the invention the deseeding operation is accomplished by means of a plurality of independently movable deseeding rollers held in yieldable engagement with the surface of a relatively large conveying roller. In one form of the invention traveling belts are provided adapted to hold the flax plant while the deseeding elements separate the seed therefrom. In another alternative form of the invention the deseeding elements are combined with a thresher.

Reference will be had first to the form of the invention shown in Figs. 1 to 3 of the drawings, which is especially designed for use when it is desired to deseed flax that has been cultivated especially for textile fabrics.

Referring to the drawings, A represents the frame of the machine supporting and journaling a transversely extending cross shaft 10 which supports a relatively large conveying roller B which is adapted to convey the flax plants and seeds beneath the deseeding elements C. For the sake of clearness in Fig. 2 of the drawings only the first row of deseeding elements are shown complete, the rollers 13 only of the remaining elements being shown. These deseeding elements are independently movable and yieldably held by spring means against the surface of the roller B and each in the embodiment illustrated comprises a swinging arm 11 mounted on a cross shaft 12, the arm 11 carrying at its free extremity a deseeding roller 13 which may be mounted with suitable roller bearings 14 of well known design. The shaft 10 may be driven by any suitable means such as the pulley 40 to which a power belt may be applied.

The shafts 12 are journaled in suitable brackets or frames 15 and the rollers 13 are each held in engagement with the surface of the roller or drum B by means of a spiral spring 16 having one end secured to the shaft 12 and the other end engaged with the arm 11 whereby the spring will tend to force the arm downwardly toward the surface of the drum B. In this form of the invention the deseeding elements including the rollers 13 extend only substantially half way across the width of the drum B, the remaining part of the drum having means thereon such as traveling belts D and E which will support the stalks of the flax plants while the heads are being operated upon by the deseeding elements.

The traveling belts or aprons D and E are each supported by suitable pulleys or drums 17 which remain in contact with each other during the passage over the drum B, as shown the belts converging together for feeding purposes and diverging for delivery purposes, whereby the flax plants may be fed in at the point 18 when the belts diverge. Means is provided to maintain the belts under elastic tension, the means I have illustrated comprising a weighted roller 20 bearing against one surface of the belt E and supported from a pivoted arm 21 together with a roller 22, the shaft 23 of which is forced by a spring 24 to carry the roller into engagement with the surface of the belt D.

The flax plants are adapted to be fed onto the upper surface of the belt E from a platform 25 and the portion of the belt immediately adjacent to the platform 25 may be given additional support by means of a platform 26.

It will be observed that the frames 15 supporting the deseeding members C are substantially semicircular in form and supported in the frame A. The platform 25 may be conveniently supported from a bracket 27 while the outermost roller 17 for the belt D is supported from a similar bracket 28. Additional brackets 29 may be provided on the frame 15 to certain of the rollers 17. The roller 23 may be supported from a suitable bearing box 30 on a bracket 31.

In the operation of this form of the invention, the sheaf of unthreshed flax is opened out and spread upon the lower traveling belt or apron E with the stalks of the plant lying parallel with the axis of the roller D and parallel to each other and in such a manner that the heads upon which are the seed balls project over the side of the traveling apron. As the lower traveling apron meets the upper traveling apron, both aprons being of the same width, they firmly grip the stalks but in a manner that will not damage them. The heads of the plants with the seed balls projecting from them will pass beneath the deseeding elements C and the rollers which are conveniently arranged in staggered rows will operate on them crushing the seed balls and liberating the seed. The chaff and seed falling from the rollers are carried to any suitable cleaner for separating the seed from the chaff. The stalks of the plant which have been freed from the seed balls are carried on by the traveling aprons and delivered lying parallel to each other. The number of revolutions per minute imparted to the roller B may be governed only by capacity to feed the flax on to the traveling apron in the proper manner.

Where it is desired to deseed flax that has been cultivated specially for linseed the traveling aprons are removed altogether from the machine and the rollers 13 and the deseeding elements C continue to cross the full width of the roller B. The flax that has been cut but not bound and which is in a mixed and tangled condition is fed directly into the machine and passes between the small rollers 13 and the large roller B. These small sectional rollers lend themselves to the unevenness of the mass. Each sectional roller 13 exerting an independent pressure to that part of the mass with which it is in immediate and momentary contact. The initial pressure brought to bear upon the small sectional rollers 13 is transmitted to the mass through which are distributed the heads of the plants bearing the seed balls. These are crushed by pressure and the seed liberated. The deseeded flax stalks are delivered from the rollers on to decks or racks of any suitable form, there it is shaken and the seed and chaff falling into the cleaner are separated and delivered in the usual way.

In the alternative form of the invention shown in Figs. 4 and 5, F represents an ordinary threshing machine and G the conveying cylinder which I insert in place of the usual tooth cylinder used in deseeding wheat or other cereals. H represents a plurality of threshing elements of similar design to the elements C and arranged part way around the periphery of the threshing cylinder G, the arrangement of the rollers 13$^a$ of the elements H being as shown in Fig. 5. The flax plant, in the form of the invention, will be fed to the cylinder G by the usual conveying belt I on a threshing machine, and the seed will be separated from the stalks in the manner already described, the different seeds and stalks being separated by the threshing machine in the usual manner well known in the art.

As many changes could be made in the above construction, and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. In a machine for the purpose specified and in combination, a relatively large conveying roller, and a plurality of deseeding rollers held in yieldable contact with the surface of the conveying roller and arranged in staggered rows.

2. In a machine for deseeding flax, a relatively large conveying roller, deseeding means comprising a plurality of rows of independently yieldable rollers coacting with the conveying roller, and means for passing the flax plants beneath the yielding rollers.

3. In a machine for deseeding flax, a relatively large conveying roller, deseeding means comprising a plurality of independently yieldable deseeding rollers arranged in staggered rows and coacting with the conveying roller, and means for passing the flax plants beneath the deseeding rollers.

4. In a machine for deseeding flax, a relatively large conveying roller, deseeding means comprising a plurality of independently swinging roller carrying arms and designed to coact with the conveying roller, and means for passing the flax plants beneath the swinging rollers.

5. In a machine for deseeding flax, a relatively large conveying roller, deseeding means comprising a plurality of rows of independently swinging roller carrying arms and designed to coact with the conveying roller, and means for passing the flax plants beneath the swinging rollers.

6. In a machine for deseeding flax, a relatively large conveying roller, deseeding means comprising a plurality of independently swinging roller carrying arms arranged in staggered rows and designed to coact with the conveying roller, and means for passing the flax plants beneath the swinging rollers.

In witness whereof I have hereunto set my hand in the presence of two witnesses.

FREDERIC LANGTRY van ALLEN.

Witnesses:
T. H. H. SMITH,
EVELYNE PETTINGER.